United States Patent
Kelly et al.

(10) Patent No.: US 7,606,471 B2
(45) Date of Patent: Oct. 20, 2009

(54) VIDEO LANGUAGE FILTERING BASED ON USER PROFILE

(75) Inventors: Declan Patrick Kelly, Shanghai (CN); Gobert Willem Renswoud Leibbrandt, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 724 days.

(21) Appl. No.: 10/554,384

(22) PCT Filed: Apr. 22, 2004

(86) PCT No.: PCT/IB2004/001301

§ 371 (c)(1),
(2), (4) Date: Oct. 25, 2005

(87) PCT Pub. No.: WO2004/098180

PCT Pub. Date: Nov. 11, 2004

(65) Prior Publication Data

US 2006/0294570 A1    Dec. 28, 2006

(30) Foreign Application Priority Data

Apr. 30, 2003  (EP)  ................................. 03300010

(51) Int. Cl.
| H04N 5/00 | (2006.01) |
| H04N 5/50 | (2006.01) |
| H04N 5/445 | (2006.01) |
| H04N 7/00 | (2006.01) |
| H04N 7/16 | (2006.01) |
| G06F 17/28 | (2006.01) |
| G11B 11/00 | (2006.01) |
| G11B 27/36 | (2006.01) |

(52) U.S. Cl. .................. 386/125; 386/95; 348/461; 348/468; 348/564; 348/569; 369/53.22; 369/53.31; 715/205; 725/39; 725/136; 725/137; 725/139

(58) Field of Classification Search ................. 386/125, 386/95, E5.107, E5.064; 348/461, 468, 564, 348/569, E5.007, E5.099, E5.105, E5.108, 348/E5.122; 369/53.22, 53.31; 715/205; 725/39, 136, 137, 139

See application file for complete search history.

(56) References Cited

U.S. PATENT DOCUMENTS

| 5,396,264 | A | 3/1995 | Falcone et al. | |
| 5,548,509 | A * | 8/1996 | Takagi | ........................ 715/205 |
| 7,051,360 | B1 * | 5/2006 | Ellis et al. | .................... 725/136 |
| 7,136,579 | B2 * | 11/2006 | Kim | ........................... 386/125 |
| 2002/0044222 | A1 * | 4/2002 | Lee | ............................. 348/564 |
| 2002/0167548 | A1 | 11/2002 | Murray | |

FOREIGN PATENT DOCUMENTS

| EP | 0677843 A1 | 10/1995 |
| EP | 1158800 A1 | 11/2001 |

OTHER PUBLICATIONS

ISR Publication, International Publication No. WO2004/098180A1.

* cited by examiner

Primary Examiner—Thai Tran
Assistant Examiner—Syed Y Hasan

(57) ABSTRACT

The invention relates to video player devices intended to play a video content DSC including audio tracks forming a disc audio languages list DAL and/or subtitles forming a disc subtitle languages list DSL, in a given number of languages. According to the invention, said device comprises a user interface UIA enabling the user to define a list of interesting languages UPL and a memory MEM to store the list of interesting languages UPL. Said device can then generate a dynamic menu ATL, STL intended to be displayed by filtering of the languages list DAL, DSL of the audio tracks present on the disc in accordance with the list of interesting languages UPL. Said dynamic menu ATL, STL is such that languages of the list of interesting languages UPL have priority in the dynamic menu ATL, STL. The invention enables the user to make an easier choice of a language for video content including audio tracks and/or subtitles in many different languages.

5 Claims, 2 Drawing Sheets

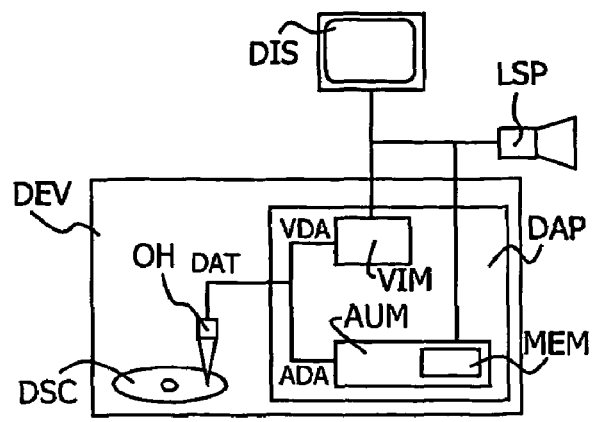
FIG.1
FIG.2
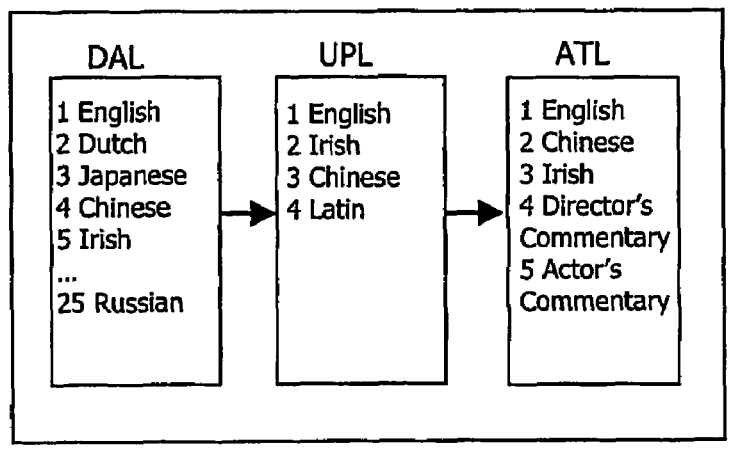
FIG.3

VIDEO LANGUAGE FILTERING BASED ON USER PROFILE

FIELD OF THE INVENTION

The invention relates to a video player device at least intended to play a video content that includes audio tracks and/or subtitles in a given number N of languages, said number N being higher than 5. Said video content may, for example, be an optical disc published with many languages and subtitles. Such an optical disc is, for example, a DVD. The term 'language' is used in a generic way for audio tracks and subtitles. The invention also relates to a dynamic menu generation method.

BACKGROUND OF THE INVENTION

Such a video player device is known from document EP1158800. This document presents a device for playing video received from terrestrial TV, satellite TV, web TV including digital TV transmission, or video media such as cassette, CD and DVD. This device may thus be a set top box or a TV receiver or video recorder, DVD or any optical disc (BluRay . . . ) player. If the user of the device likes to watch a video with the audio track in a preferred language, a language menu can be provided on a display of the device. The language menu presents a list of several language options to the user of the device, each of the several language options representing audio translation data in a different language. The user can select a language option corresponding to the language preferred by the user from the language menu.

The device of the prior art thus proposes a language selection from a fixed list of languages among which the user has to choose.

This method is also used for video derived from optical discs: a list of languages is displayed on a screen, this screen being, for example, the screen of a TV linked to an optical disc reader device. This list belongs to a menu that is stored on the optical disc itself or that is determined by the player device itself. There is no way of modifying this list as it has been laid down on the optical disc or in the device.

Optical discs are published with many audio tracks and subtitles. This can make navigating through the list and switching between languages very tedious. Switching between audio tracks or subtitles by choosing previous and next commands in a list of as many as 20 languages is very tedious if the two languages the user is switching between are, for example, number 1 and 11 in the list. The list of languages may also include director's and actor's commentaries, and switching to these audio tracks and back to the original is a practical feature.

Thus, for example, DVD allows at most audio tracks in 8 languages, which can be switched between from a player menu or chosen from a menu authored on the optical disc, for example e.g. a disc-based menu. The choice to limit the number of audio track languages in DVD to 8 was made in part because of the problem with choosing from a large list in the player menu or in the disc-based menu.

A language feature provided in DVD player devices allows the user to configure the player with a default language so that by default the player will choose the menus in this language, i. e. the audio track in this language if available, or else the subtitle in this language. The manufacturer of the device may also configure this language feature during manufacture or just after according to the country where the player device is intended to be sold. With such a feature, when the user wants to change the language of the audio track and/or of the subtitles, the user has to return to the disc-based menus, which is time consuming and rather complicated.

SUMMARY OF THE INVENTION

It is an object of the present invention to propose an improvement in the video player device to enable the user to have an easier and more user-friendly way of choosing a language of an audio track or of a subtitle for a video play.

To this end, the invention proposes a video player device as presented in the introductive part, characterized in that it comprises a user interface enabling the user to define a list of interesting languages, a memory for storing the list of interesting languages, and means for generating a dynamic menu intended to be displayed by filtering the languages of the audio tracks present on the disc in accordance with the list of interesting languages, said dynamic menu being such that languages of the list of interesting languages have priority in the dynamic menu.

The invention then allows the user to define a list of interesting languages; typically a user is only interested in a small number of languages understood by family and friends. Thus the choice is facilitated as the user can choose directly from among interesting languages that are displayed in priority in the menu according to the invention. Effectively, the user only sees the languages that have priority when performing normal language/subtitle change operations. This ensures that normal user operation is not inhibited by the fact that the disc supports a large selection of languages.

In an advantageous embodiment, the dynamic menu is a player menu where the languages of the list of interesting languages in which audio tracks are present on the disc are displayed at the beginning of the dynamic menu. A player menu according to the invention enables the user to return very easily to the dynamic menu while watching the video without having to return to the disc-based menu. For example, only the languages of the list of interesting languages are listed in the dynamic menu. Thus, the player device filters the languages present among the audio tracks on the disc or in the video stream and only displays the chosen languages in the menu for switching languages during playback. Therefore, if the remote control allows to navigate through the menu, it will allow choosing previous next audio tracks among the filtered list. Therefore, the priority is given to the interesting languages in that these languages only are listed.

In a preferred embodiment, the dynamic menu is a disc-based menu wherein a list of languages stored in the disc-based menu is reorganized before display in order to display the list of interesting languages in priority. Thus even if the user does not use the player menu but the disc-based menu, for example at the beginning of the reading of the disc, the choice will be easier in a device implementing the invention. Even the disc-based menus are thus customized according to the invention.

The invention also relates to a method of generating a dynamic menu that is advantageously implemented in a video player device of the invention.

BRIEF DESCRIPTION OF THE DRAWINGS

The invention is described hereafter in detail with reference to the diagrammatic Figures wherein:

FIG. 1 presents a schematic representation of a device according to the invention;

FIG. 2 depicts the user interface according to the invention;

FIG. 3 illustrates the functioning of the invention for audio tracks;

DESCRIPTION OF EMBODIMENTS

Figure 4:
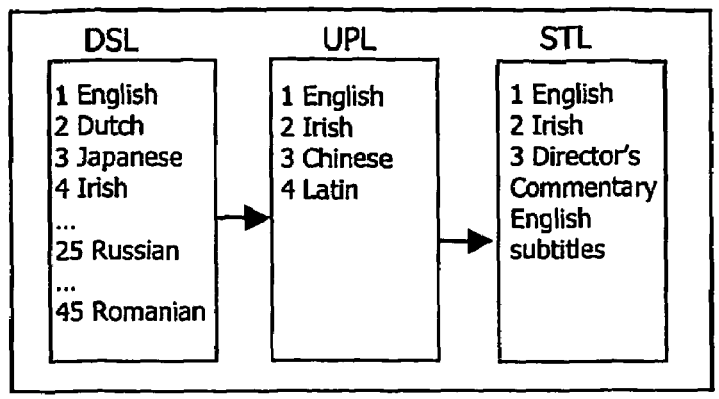
FIG. 4 illustrates the functioning of the invention for subtitles.

FIG. 1 shows a video player device DEV according to the invention. According to the specific example shown in FIG. 1, the video player device DEV is an optical disc DSC reader device including an optical head OH for reading data DAT on the optical disc. Said optical disc is read by said optical head OH and provides data DAT, i. e. video signals, to a data processor DAP. This specific example is only given as an illustration of the invention and does not exclude any other video player devices DEV receiving video signals from a source other than an optical disc. The essential feature of the video signals DAT processed by the video player device DEV is that the video is received with several audio tracks or several subtitles in different languages within the digital video signals DAT. Said video player device DEV is linked to display means DIS and to audio means, for example a loudspeaker LSP. In this example, the display means DIS and the loudspeaker LSP are separated from the video player device DEV but this does not exclude the case where one of them or both are integrated within the video player device DEV itself. For example, it would be the case in a TV list including integrated features for playing video.

Video signals DAT provided to the data processor DAP include audio data ADA and video data VDA. These different data are each sent to dedicated modules. Video data VDA are sent to a video module VIM and audio data ADA are sent to an audio module AUM. Said audio module AUM is in communication with said display means DIS and said audio means LSP. Said audio module AUM comprises at least a memory MEM for the purpose of the invention. Said memory MEM is a non-volatile memory. Said audio module AUM also comprises software for performing the essential functions of the invention: a user interface enabling the user to define a list of interesting languages and means for generating a dynamic menu intended to be displayed.

FIG. 2 depicts a user interface according to the invention. Such a user interface is realized by a display on display means DIS and controlled by software implemented in the video player device. The user can control this user interface by mean of buttons on the video player device or by means of a remote control. FIG. 2 depicts what is displayed on the screen of the display means DIS. In this example, the video player device DEV proposes the user to list four languages so as to define a list of interesting languages. A scrolling menu presented for each language, from language 1 to language 4, can be controlled by previous and next commands or in alphabetical order, the different letters being, for example, called by pressing a number on the remote control. The list of four languages is stored in the non-volatile memory MEM.

Advantageously, if the user chooses a language from outside the list of interesting languages, this language will be automatically added to the list of languages that can be switched to from the player menu or from the disc-based menu. With such an automatic modification of said list of interesting languages, it is possible not to ask the user to define the list of interesting languages. In this case, the video player device learns the list of interesting languages over time by the choices the user makes for languages of audio tracks and subtitles when watching video.

The user interface may also be less user-friendly and more implicit to an action of the user. It can be realized by the help of the disc itself or of its package. Effectively, the list of interesting languages can be pressed on the disc in dependence where the disc is sold. This has the drawback that making a world disc is prevented, because the information has to be pressed on the disc. Nevertheless setting a simple 'country code' in the authoring process can generate such list of interesting languages without changing anything else. This is not a problem as discs for different countries are generally manufactured separately because labels usually include a local classification level. Another solution is to provide the disc with a chip. With such a user interface, a piece of hardware may be necessary to implement the invention. For example, a chip reader may be necessary in the latter user interface with a chip integrated on the disc. Moreover, a piece of software needs to be added to control this hardware if a piece of hardware is necessary and to interpret the information that is read on the optical disc.

Another solution is to provide the package of the optical disc with a bar code to be read by the player equipped with a bar code reader that is a hardware part of the user interface. A 2-digit or 3-digit code may also be mentioned on the package to be entered on the remote control by the user. In the latter two cases, a piece of software is again necessary to process data from the user interface.

A solution specific to web-connected video player devices is that the website associated with the disc sends the list of interesting languages in order that the appropriate default list of interesting languages can be downloaded. For this to work, the video player device includes means for sending the country/region information (or country code) on the user's location to the website and, based on this region information, the website returns the default list for that country/region.

FIG. 3 illustrates the functioning of the invention for audio tracks. For example, the video content is derived from an optical disc that contains audio tracks in 25 languages, which list of 25 languages is referred to as disc audio languages list DAL. The user has chosen four languages that constitute the list of interesting languages UPL. According to the invention, the disc audio languages list DAL on the optical disc is filtered in accordance with the list of interesting languages UPL. This filtering leads to the establishment of an audio toggle list ATL of audio tracks that will have priority in a dynamic menu for audio tracks, generated by a piece of software in this case. Then the filtering of the disc audio languages list DAL gives a toggle list including the list of interesting languages present as audio tracks on the disc. If extra commentaries are present in one or several interesting languages on the disc, the audio tracks are listed along with the extra commentaries in the dynamic menu.

FIG. 4 illustrates the functioning of the invention for subtitles. For example the video content is derived from an optical disc that contains subtitles in 45 languages, which list of 45 languages is referred to as disc subtitle languages list DSL. The user has chosen four languages that constitute the list of interesting languages UPL. According to the invention, the disc subtitle languages list DSL on the optical disc is filtered in accordance with the list of interesting languages UPL. This filtering leads to the establishment of a subtitle toggle list STL of subtitles that will have priority in a dynamic menu for subtitles, generated by a piece of software in this case. The filtering may also include commentaries as subtitles, so the user can listen to the original audio track while the commentary is shown as subtitles.

Figure 5:
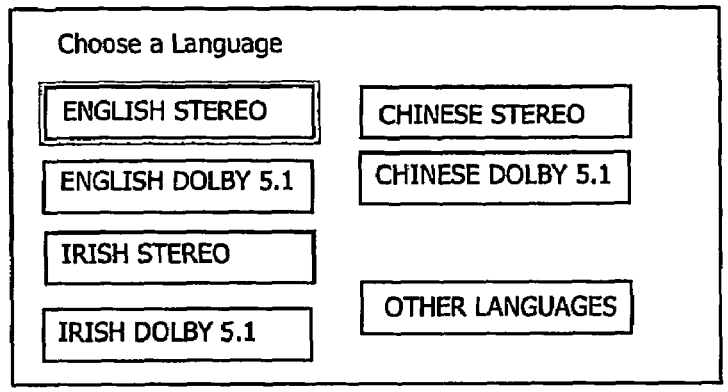
FIG. 5 presents an example of a dynamic menu obtained according to the invention.

FIG. 5 presents an example of a dynamic menu obtained according to a first implementation of the invention. Such a dynamic menu shows languages resulting from filtering in FIG. 3 and a button allowing access to further languages. In this example, each audio track can be played by the video player device according to two standards: stereo and Dolby 5.1. Here, the first language 'English stereo' is highlighted. For a user having different preferences, this language dynamic menu will contain different languages but a similar layout. The choice of director's commentary and actor's commentary listed after the three first languages may advantageously be listed at the beginning of the list displayed upon pressing of the button giving access to 'other languages'. Therefore, the filtering according to the invention does not limit the user's possibilities as it is always possible to choose another language from outside the list of interesting languages.

Figure 6:
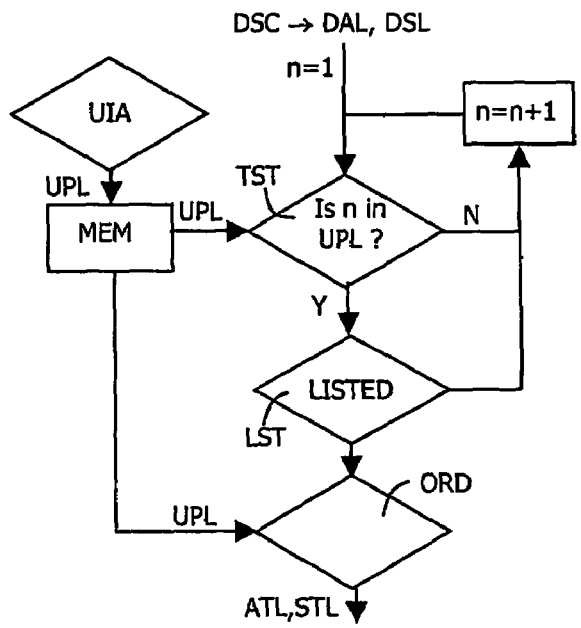
FIG. 6 is a schematic diagram depicting the generation of the dynamic menu according to the invention.

FIG. 6 is a schematic diagram depicting the method of generating of the dynamic menu according to the invention. It is also a schematic diagram showing the functioning of the invention. A first step UIA of acquiring a list of interesting languages UPL is realized. A user interface as presented hereinabove enables this acquisition. Then said list UPL of interesting languages is stored in a non-volatile memory MEM. The video content DSC that will be played by a video player device in which said method is implemented includes audio tracks and/or subtitles in a given number N of languages that constitute a disc audio languages list DAL and a disc subtitle languages list DSL. In this example, each language of the disc audio languages list DAL or of the disc subtitle languages list is then represented by a number n as, for example, presented in FIGS. 3 or 4. According to FIGS. 3 or 4, n=1 thus corresponds to English. A step TST of comparing each language n of said disc audio languages list DAL with a list of interesting languages UPL stored in a memory MEM is thus realized according to a method of the invention. Then a step LST of listing the language n in the dynamic menu is realized if said language n is equal to one of the languages in said list of interesting languages UPL. If said language n is not present in said list of interesting languages UPL, n is incremented (n=n+1) in order to start the steps of the method for another language. At last, a step ORD of ordering the languages listed in the dynamic menu according to the order in the list of interesting languages UPL is realized. An audio or subtitle toggle list ATL or STL as presented in FIGS. 3 and 4 is then obtained according to the invention. This toggle list is then displayed as the dynamic menu. Said obtained dynamic menu is such that languages of the list of interesting languages have priority in the dynamic menu.

In optical disc players it is possible to use the list of interesting languages twice, as there are two different kinds of menu: player menus and disc-based menus. Effectively, once the list of interesting languages is defined, the player can use this list of interesting languages in two different ways, i. e. in order to be useful for the player menu in switching languages during playback and for the disc-based menus.

The player menu for switching languages during playback is generated by the video player device itself externally to the optical disc. This player menu is not read on the disc for display but displayed by the video player device with only the knowledge of the list of languages present on the optical disc. Then, according to the invention, the player filters the list of languages present on the disc against the list of interesting languages. The player device only displays these languages, along with any extra commentaries, in the player menu. If the language of the extra commentaries is not included in the list of interesting languages, it may optionally be suppressed (unless appropriate subtitles are available). If the remote control allows choosing previous and next audio tracks by pressing number keys or previous and next keys, then this will only apply to the filtered list. In this player menu, the result of the filtering is the list of languages from the disc that the user may potentially be interested in along with extra commentaries that may possibly be listed on the same page or at the beginning of a second page accessed by choosing 'other languages' in the dynamic menu presented in FIG. 5. This makes it easy for the user to call up extra commentaries in a preferred language while watching the video.

Disc-based menus are generally only read on the disc and displayed directly without any processing. According to the invention, the disc-based menus are organized in order to reflect the list of interesting languages chosen by the user. This menu from the optical disc allows to choose the audio track or subtitle. It is presented according to the invention such that the list of interesting languages is presented first in the menu or else on a first page with a link to the second page. In this case the menu from the disc is also a dynamic menu as described hereinabove.

Presented Figures are illustrative of special embodiments of the invention and are not restrictive. It will be apparent to those skilled in the art that many modifications and variations may be made to the exemplary embodiments of the present invention list set forth above without departing substantially from the principles of the present invention. For example, the present invention may be used with any optical record carrier of any format. All such modifications and variations are deemed to be included herein.

The invention claimed is:

1. A video player device intended to play a video content that includes audio tracks and/or subtitles in a given number N of languages, said number N being higher than 5, comprising:
   a user interface enabling the user to define a list of interesting languages,
   a memory for storing the list of interesting languages, and
   means for generating a dynamic menu intended to be displayed by filtering the languages of the audio tracks present on the disc in accordance with the list of interesting languages, said dynamic menu being such that languages of the list of interesting languages have priority in the dynamic menu.

2. A video player according to claim 1, wherein the dynamic menu is a player menu displaying the languages of the list of interesting languages in which audio tracks are present on the disc at the beginning of the dynamic menu.

3. A video player according to claim 2, wherein said player menu only includes the list of interesting languages, other languages being only accessible from a disc-based menu.

4. A video player according to claim 1, wherein the dynamic menu is a disc-based menu in which a list of languages stored in the disc based menu is reorganized before display in order to display the list of interesting languages in a priority order.

5. A method of generating a dynamic menu intended to be displayed on display means for enabling a user to easily choose a language from a list of languages in which audio tracks for a video are provided within a video content, said method includes:
   a step of acquiring a list of interesting languages,
   a step of storing said list of interesting languages in a memory,
   a step of comparing each language of said list of languages with said list of interesting languages,
   a step of listing said language in the dynamic menu if said language is equal to one of the languages in said list of interesting languages,
   a step of ordering the languages listed in the dynamic menu in accordance with the order in which they appear in the list of interesting languages.

* * * * *